(12) United States Patent
Suzuki et al.

(10) Patent No.: US 7,670,069 B2
(45) Date of Patent: Mar. 2, 2010

(54) SHUTTER DRIVE DEVICE FOR CAMERA

(75) Inventors: Mitsuru Suzuki, Chiba (JP); Akihiro Ito, Chiba (JP)

(73) Assignee: Seiko Precision Inc., Narashino-shi (JP)

(*) Notice: Subject to any disclaimer, the term of this patent is extended or adjusted under 35 U.S.C. 154(b) by 0 days.

(21) Appl. No.: 12/365,454

(22) Filed: Feb. 4, 2009

(65) Prior Publication Data
US 2009/0148154 A1    Jun. 11, 2009

Related U.S. Application Data

(63) Continuation of application No. PCT/JP2007/073951, filed on Dec. 12, 2007.

(30) Foreign Application Priority Data

Dec. 19, 2006    (JP) ............................. 2006-341597

(51) Int. Cl.
*G03B 9/08*    (2006.01)
(52) U.S. Cl. ................................... 396/463
(58) Field of Classification Search ................ 396/452, 396/463, 468, 449, 493, 508, 505; 359/230, 359/234
See application file for complete search history.

(56) References Cited

U.S. PATENT DOCUMENTS

| | | | | |
|---|---|---|---|---|
| 2,956,491 A | * | 10/1960 | Fischer et al. | 396/233 |
| 4,564,278 A | * | 1/1986 | Ohmura | 396/72 |
| 4,984,003 A | * | 1/1991 | Matsumoto et al. | 396/463 |
| 5,325,142 A | * | 6/1994 | Depatie et al. | 396/449 |
| 6,331,741 B1 | * | 12/2001 | Suzuki | 310/49 R |
| 6,363,222 B2 | * | 3/2002 | Hata | 396/257 |
| 6,572,283 B1 | * | 6/2003 | Imano | 396/463 |
| 6,800,970 B2 | * | 10/2004 | Aoshima | 310/49 R |

(Continued)

FOREIGN PATENT DOCUMENTS

JP    2005-173355 A1    6/2005

(Continued)

OTHER PUBLICATIONS

International Search Report for International Application No. PCT/JP2007/073951 dated Mar. 3, 2008.

*Primary Examiner*—W. B. Perkey
*Assistant Examiner*—Noam Reisner
(74) *Attorney, Agent, or Firm*—Kratz, Quintos & Hanson, LLP

(57) ABSTRACT

In a shutter drive device for a camera, the device including: a plate having an aperture; a shutter blade provided in the plate, and for opening and closing the aperture; and an driving source provided in the plate, and for driving the shutter blade. The driving source includes: a rotor magnetized with plural magnetic poles in a circumferential direction, and rotatable about an axis thereof; a stator generating magnetic force against the rotor; and a coil provided in the stator and for exciting the stator. The rotor has an arm portion extending outwardly in a direction perpendicular to the axis of the rotor, and a pin portion engaging with the shutter blade and provided in the arm portion to stand. The rotor, the arm portion and the pin portion are disposed within a thickness of the coil in the axis direction.

6 Claims, 5 Drawing Sheets

U.S. PATENT DOCUMENTS

| | | |
|---|---|---|
| 6,960,848 B2 * | 11/2005 | Naganuma et al. ............ 310/37 |
| 2005/0146233 A1 | 7/2005 | Miyawaki |
| 2006/0250705 A1 | 11/2006 | Numnual |

FOREIGN PATENT DOCUMENTS

| | | |
|---|---|---|
| JP | 2005-195817 A1 | 7/2005 |
| JP | 2005-224091 A1 | 8/2005 |
| JP | 2006-126515 A1 | 5/2006 |
| JP | 2006-153915 A1 | 6/2006 |
| JP | 2007-233053 A1 | 9/2007 |

* cited by examiner

SHUTTER DRIVE DEVICE FOR CAMERA

CROSS-REFERENCE TO RELATED APPLICATION

This application is a continuation of and claims priority to International Patent Application No. PCT/JP2007/073951 filed on Dec. 12, 2007, which claims priority to Japanese Patent Application No. 2006-341597 filed on Dec. 19, 2006, subject matter of these patent documents is incorporated by reference herein in its entirety.

BACKGROUND OF THE INVENTION

1. Field of the Invention

The present invention relates to a shutter drive device for a camera.

2. Description of the Related Art

Conventionally, an electromagnetic actuator is employed as a driving source of a shutter blade for a camera (see Japanese Unexamined Patent Application Publication No. 2005-173355). FIG. 5 is a cross-sectional view of a conventional shutter drive device for a camera in which an electromagnetic actuator is employed as a driving source. Such a shutter drive device for a camera includes: an electromagnetic actuator; an upper plate 160 and a lower plate 150 supporting the electromagnetic actuator and each having an opening (not shown) for shooting; and shutter blades 170 to 173 disposed between the lower plate 150 and a blade supporting plate 180. The electromagnetic actuator includes: a coil 140 for excitation; a rotor 120 magnetized with different magnetic poles in a circumferential direction; a spindle 152 supporting the rotor 120 for rotation; a stator 110 excited with magnetic force relative to the rotor 120 by energization of the coil 140.

The rotor 120 is provided with a outputting member 130 which rotates in conjunction with the rotor 120. The outputting member 130 is provided with a pin portion 131. The pin portion 131 outputs the driving force of the rotor 120 to the shutter blades 170 to 173. This causes the shutter blades 170 to 173 to open and close the opening for shooting. In addition, the lower plate 150 and the blade supporting plate 180 which define a blade chamber are provided with opening 151 and 181, respectively. The openings 151 and 181 receive the rotation of the pin portion 131.

However, in such a shutter drive device for a camera, the shutter blades overlap with each other in a rotational axis of the rotor 120. This increases the thickness in the axial direction of the rotor 120. Therefore, in an electronic apparatus employing such a shutter drive device for a camera, degrees of freedom of the layout of electronic components is limited. Further, the lower plate 150 and the blade supporting plate 180, which define the blade chamber, respectively have the opening 151 and 181 for receiving the rotation of the pin portion 131, and these openings are the second longest after the opening for shooting. Therefore, this may allow dusts to enter the blade chamber via the opening for receiving the rotation of the pin portion 131. The entering dust may affect on the actions of the shutter blades.

SUMMARY OF THE INVENTION

It is therefore an object of the present invention to provide a shutter drive device for a camera, the device having a thinner and preventing the dust from entering into the shutter from the outside.

According to an aspect of the present invention, there is provided a shutter drive device for a camera, the device including: a plate having an aperture; a shutter blade provided in the plate, and for opening and closing the aperture; and an driving source provided in the plate, and for driving the shutter blade. The driving source includes: a rotor magnetized with different magnetic poles in a circumferential direction, and rotatable about an axis thereof; a stator generating magnetic force against the rotor; and a coil provided in the stator and for exciting the stator. The rotor has an arm portion extending outwardly from the axis of the rotor, and a pin portion engaging with the shutter blade and provided in the arm portion to stand. The rotor, the arm portion and the pin portion are disposed within a thickness of the coil in the axis direction.

With such a configuration, the rotor, having the arm portion and the pin portion and composed of the driving source for driving the shutter blades, is disposed within the thickness of the coil in the direction of the axis supporting the rotor for rotation, thereby reducing the thickness of the shutter drive device for a camera in the axis direction. This also allows the shutter drive device for a camera to be thin. Additionally, with such a configuration, the shutter drive device for a camera is sealed by the plate having a spindle about which the shutter blade rotates. It is not necessary to provide an opening for receiving the rotation of the pin portion, thereby preventing the dust from entering into the shutter from the outside.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
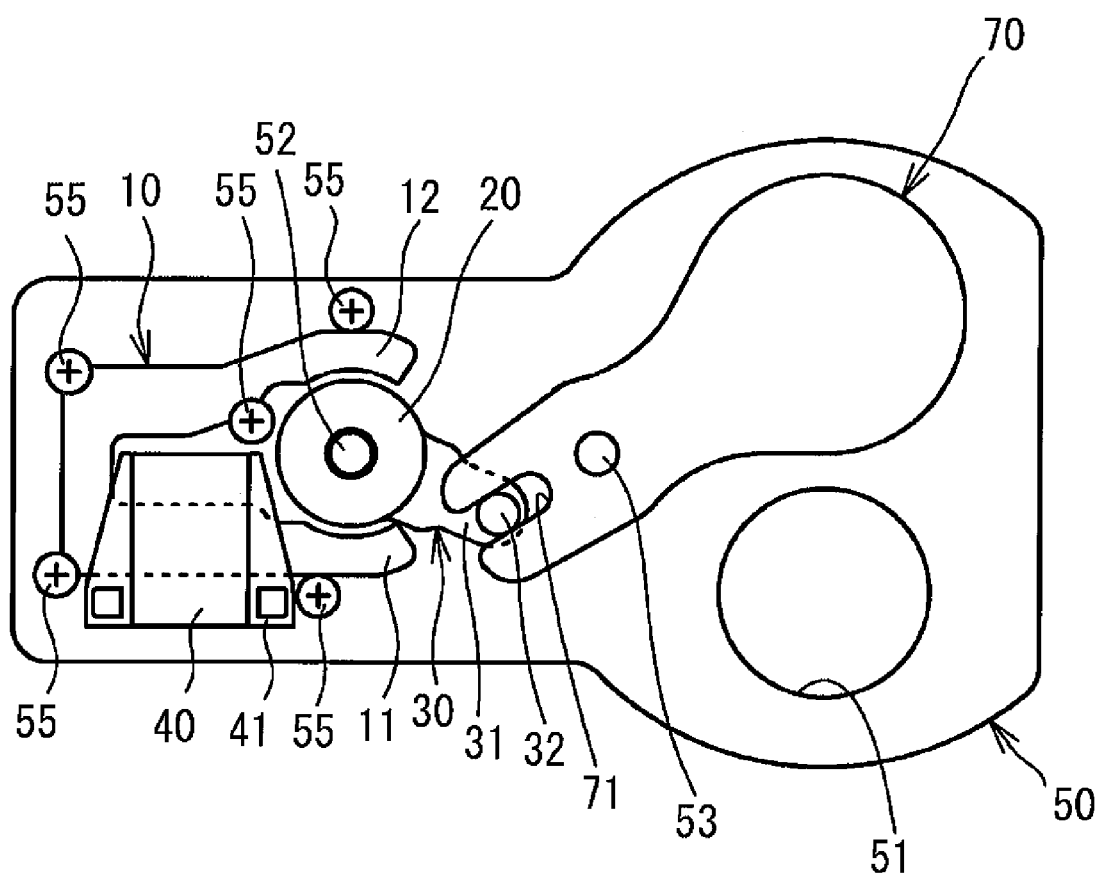
FIG. 1 is a front view of a shutter drive device for a camera in which an opening for shooting is in a fully open state.
Figure 2:
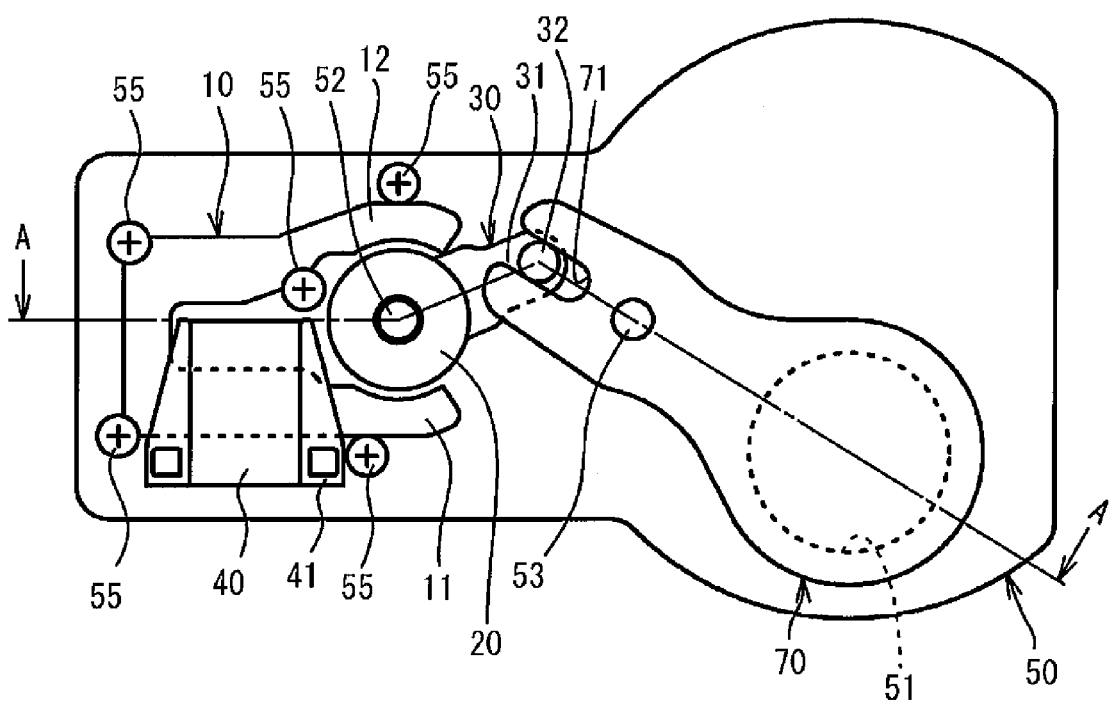
FIG. 2 is a front view of a shutter drive device for a camera in which an opening for shooting is in a fully closed state.
Figure 3:
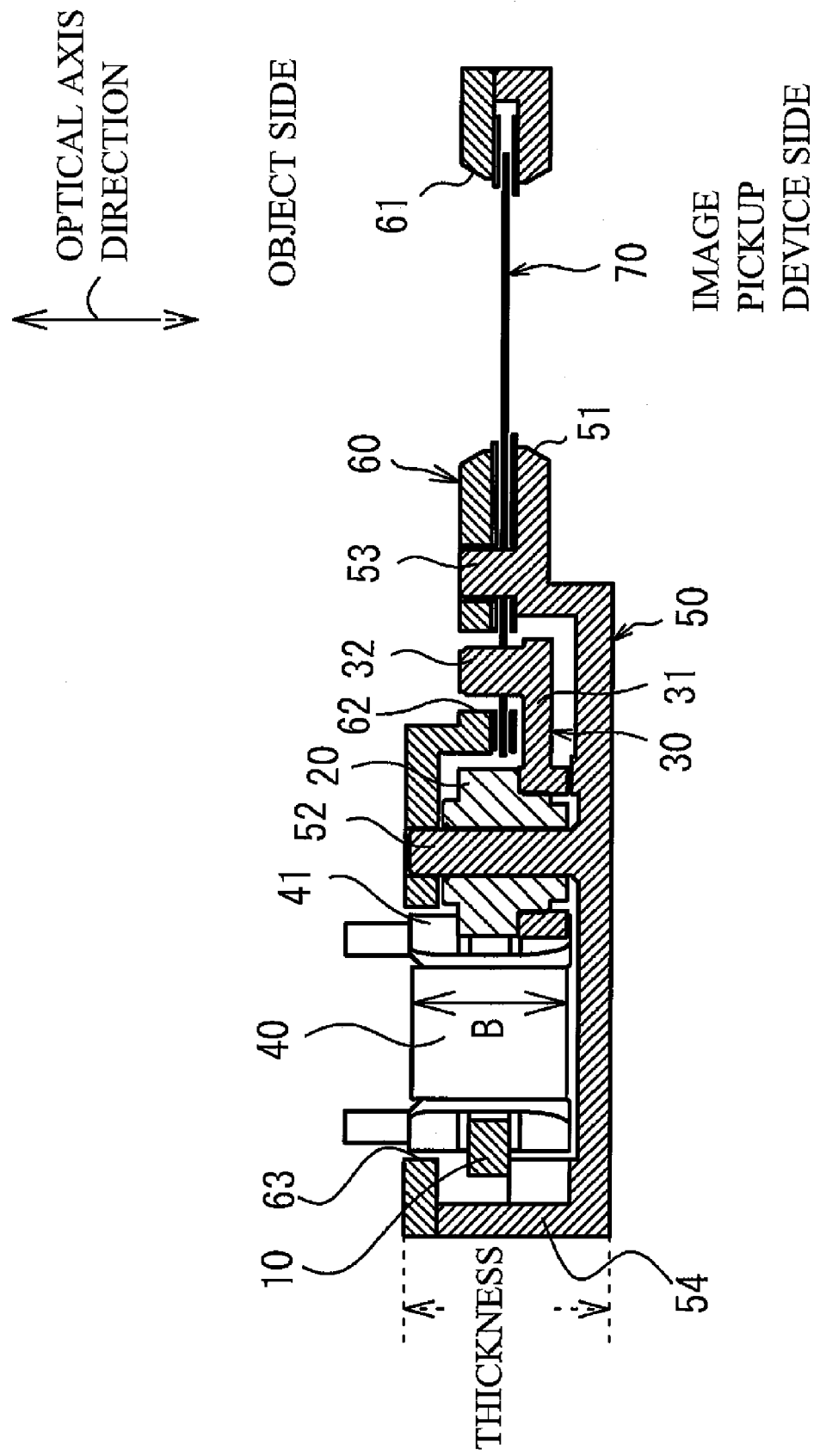
FIG. 3 is a cross-sectional view taken along A-A in FIG. 2.

A description will now be given, with reference to the accompanying drawings, an embodiment of the present invention. FIGS. 1 to 3 are schematic view of a shutter drive device for a camera according to the present embodiment. FIG. 1 is a front view of a shutter drive device for a camera in which an opening for shooting is in a fully open state. FIG. 2 is a front view of a shutter drive device for a camera in which an opening for shooting is in a fully closed state. FIG. 3 is a cross-sectional view taken along A-A in FIG. 2. In addition, an upper plate 60, to be mentioned later, is omitted in FIGS. 1 and 2.

The shutter drive device for a camera according to the present embodiment includes an electromagnetic actuator, a lower plate 50, the upper plate 60, and a shutter blade 70. As shown in FIG. 3, the electromagnetic actuator and the shutter blade 70 are disposed in a space defined by the lower plate 50 and the upper plate 60. In addition, the upper plate 60 is omitted in FIGS. 1 and 2.

The electromagnetic actuator, which is employed as a driving source, includes a stator 10, a rotor 20, and a coil 40.

The electromagnetic actuator includes: the stator 10 having a U shape and having a first magnetic pole portion 11 and second magnetic pole portion 12 at both ends thereof; the rotor 20 magnetized with two different magnetic poles in a circumferential direction and having a cylindrical shape; and the coil 40 wound around a coil bobbin 41 and excites the first magnetic pole portion 11 and the second magnetic pole portion 12 each having different polar characters by energization of the coil 40.

The upper plate 60 has an opening 63 for receiving a thickness of the coil 40. A side wall 54 is formed to surround sides of the electromagnetic actuator.

Additionally, an outputting member 30 is attached to one end of the rotor 20 in the axial direction so as to output the rotation of the rotor 20 and rotate in conjunction with the rotor 20. Herein, the rotor 20 is magnetized with two magnetic poles in a circumferential direction. The rotor 20 and the outputting member 30 are jointed by adhesion or the like, so that a positional relationship between the outputting member 30 and the magnetic poles of the rotor 20 is a predetermined one. Therefore, the outputting member 30 and the rotor 20 rotates together within a predetermined range. The electromagnetic actuator is positioned by a positioning pin portion 55, for positioning, provided to stand on the lower plate 50.

The rotor 20 is rotatably supported by a spindle axle 52 integrally formed in the lower plate 50 with being penetrated by the spindle 52.

The outputting member 30 is fixed to an end, near an image pickup device, of the rotor 20. The outputting member 30 includes an arm portion 31 and a pin portion 32. The arm portion 31 extends outwardly in the direction perpendicular to an axial direction of the axis 52, which is a rotational center of the rotor 20, and the pin portion 32 is provided to stand on the arm portion 31 toward the shutter blade 70 in the optical axis direction. When the outputting member 30 is fixed to the rotor 20, the rotor 20, the arm portion 31 and the pin portion 32 are disposed within a thickness B (see FIG. 3) of the coil 40 in the axis direction of the rotor 20. The pin portion 32 engages with a engagement portion 71 having a recess shape and formed at an end of the shutter blade 70, and a swinging movement of the pin portion 32 is transmitted to the shutter blade 70. The engagement portion 71 is shaped such that the pin portion 32 is grasped at its sides.

Figure 4:
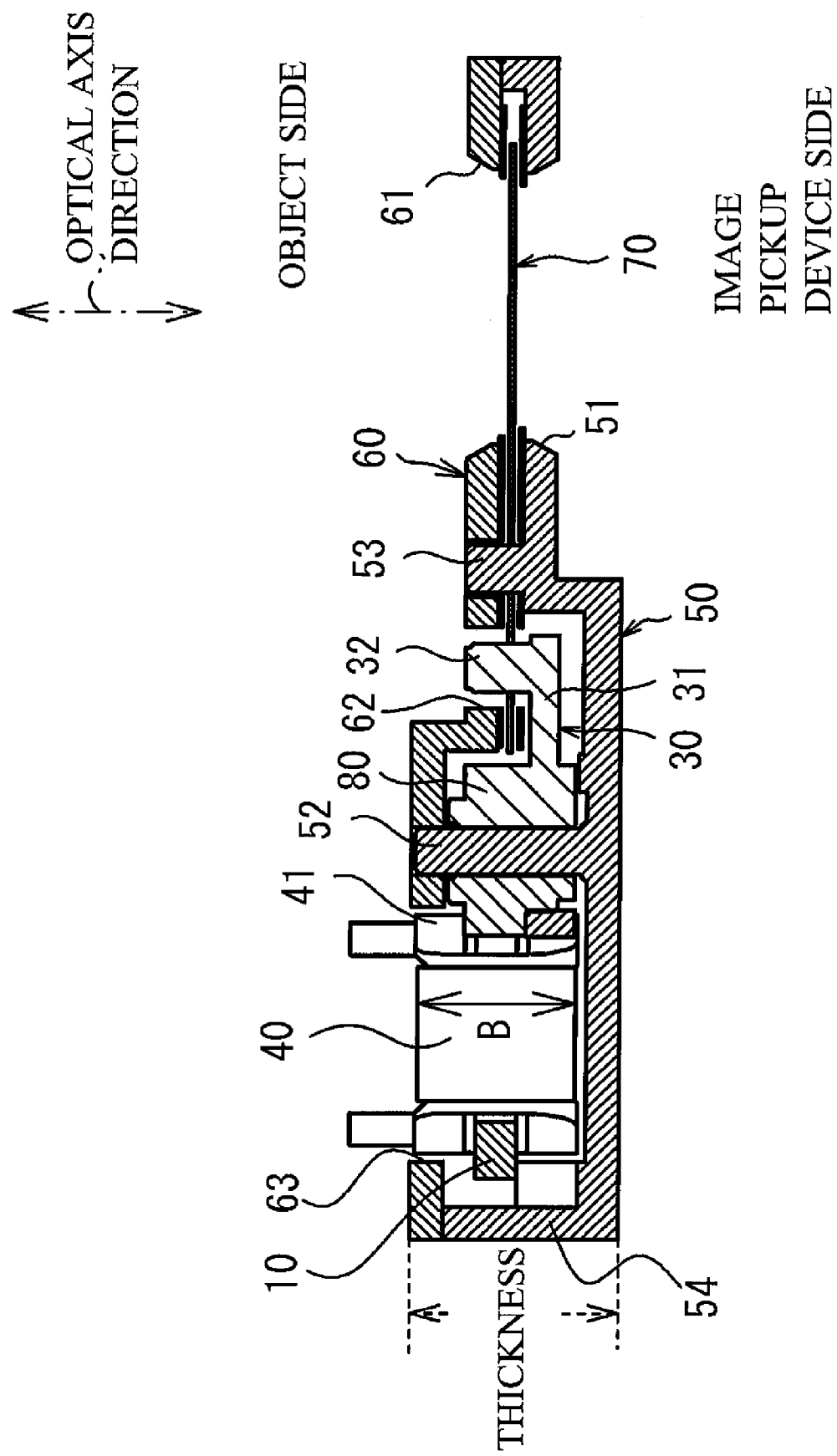
FIG. 4 is a cross-sectional view of another embodiment according to a shutter drive device for a camera.
Figure 5:
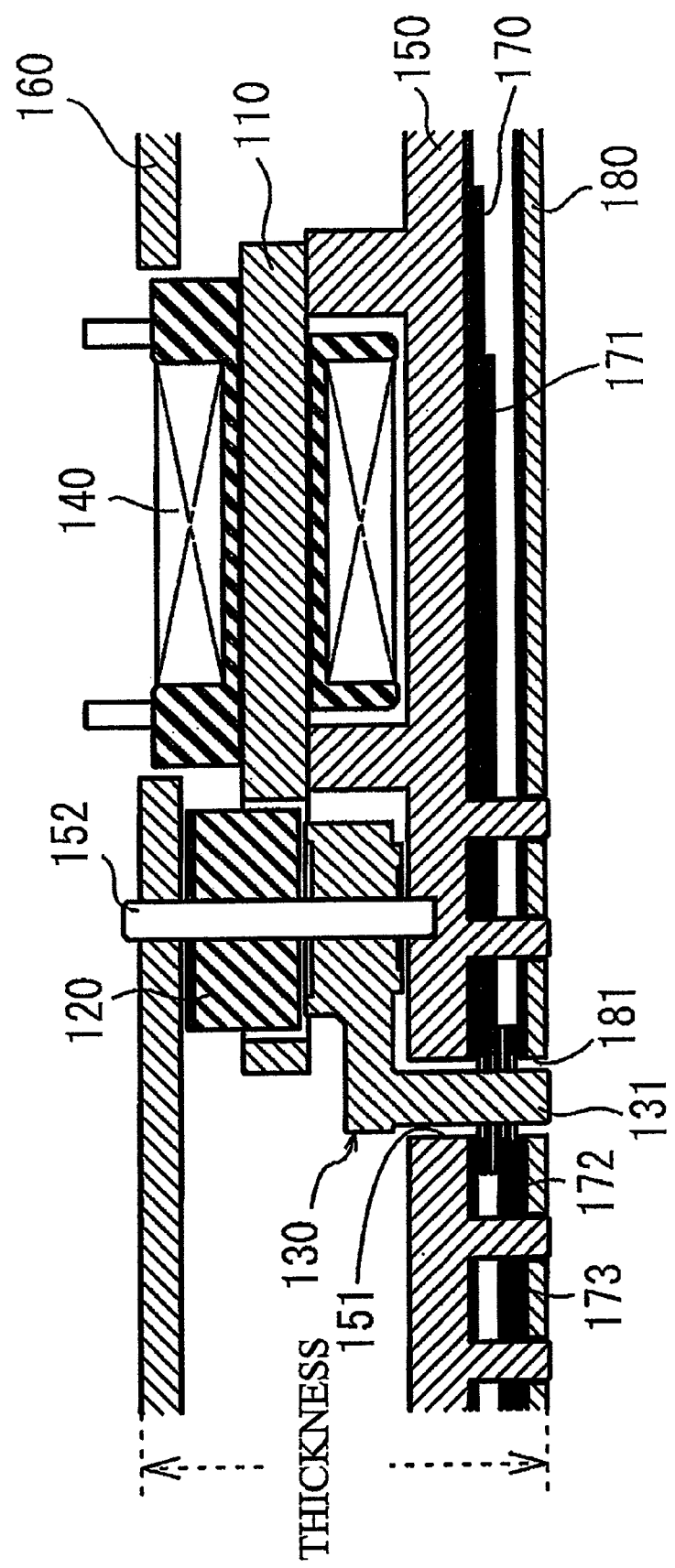
FIG. 5 is a cross-sectional view of a conventional shutter drive device for a camera.

Herein, FIG. 4 shows another embodiment according to a shutter drive device for a camera in which the rotor 20, the arm portion 31 and the pin portion 32 are integrally formed into one part. FIG. 4 is a cross-sectional view of another embodiment according to the shutter drive device for a camera, and corresponds to FIG. 3. Likewise, a rotor 80 includes the arm portion 31 and the pin portion 32. The arm portion 31 extends outwardly in the direction perpendicular to an axial direction of the spindle 52, which is a rotational center of the rotor 80, and the pin portion 32 is provided to stand on the arm portion 31 toward the shutter blade 70 in the optical axis direction. The rotor 80, the arm portion 31 and the pin portion 32 are disposed within a thickness B (see FIG. 3) of the coil 40 in the axis direction of the rotor 80. The pin portion 32 engages with a engagement portion 71 having a recess shape and formed at an end of the shutter blade 70, and a swinging movement of the pin portion 32 is transmitted to the shutter blade 70. The engagement portion 71 is shaped such that the pin portion 32 is grasped at its sides.

The lower plate 50 and the upper plate 60 have openings 51 and 61 for taking a picture, respectively. The opening 51 is brought to a fully closed state or a fully open state by driving the shutter blade 70 disposed between the lower plate 50 and the upper plate 60. Additionally, the image pickup device, not shown, for forming an image of an object is disposed at a below of the lower plate 50 to be shown in FIG. 3.

The upper plate 60 has an receiving opening 62 having a arc shape and receiving a rotation of the pin portion 32 formed on the outputting member 30. The pin portion 32 extends through the receiving opening 62 and rotates within the predetermined range.

The shutter blade 70 engages with a spindle 53 formed in the lower plate 50, and is swingably supported about the pin portion 53 within a predetermined range. In this way, the engagement portion 71 engages with the pin portion 32 formed in the outputting member 30, and the shutter blade 70 swings about the spindle 53 formed in the lower plate 50 in the predetermined range.

As shown in FIG. 3, the shutter blade 70 is arranged in a virtual plane orthogonal to the spindle 52. That is to say, the shutter blade 70 is arranged within a space having the length of the spindle 52 and being orthogonal to the spindle 52. That is, the shutter blade 70 is disposed within the thickness of the rotor 20. As mentioned above, the rotor 20, the arm portion 31 and the pin portion 32 are disposed within the thickness B of the coil 40 in the axial direction of the rotor 20. Therefore, as compared with a conventional case where a shutter blade is overlapped on a rotor in the rotational axial direction of the rotor, the thickness of the axial direction of the shutter drive device for a camera can be reduced. This reduces the thickness of the shutter drive device for a camera. Additionally, in the shutter drive device for a camera according to the present embodiment, the thickness of the shutter drive device for a camera is the sum of the thickness B of the coil 40 in the axis direction of the rotor 20 and the thickness of the lower plate 50 holding the electromagnetic actuator. Therefore, the sum of the thickness of the coil 40 and the thickness of the lower plate 50 is reduced, thereby further reducing the thickness of the shutter drive device for a camera.

Additionally, as shown in FIG. 3, the rotor 20, and the arm portion 31 and the pin portion 32 standing formed on the arm portion 31 are composed of separate member. With such a configuration, an angular position of the outputting member 30 relative to the rotor 20 is adjusted, so that the outputting member 30 is press-fitted onto the rotor 20. That is to say, since the rotor 20 is magnetized with plural magnetic poles in a circumferential direction, and the angular position of the outputting member 30 relative to the magnetic pole of the rotor 20 is adjusted, so that the outputting member 30 is press-fitted onto the rotor 20. This changes the design of the angular position with ease. Therefore, in the design stage of the shutter drive device for a camera, it is possible to change and adjust the angular position of the outputting member 30 relative to the rotor 20, after locations of other parts are designed by priority. Further, if a problem is caused during the product inspection prior to mass production, the angular position of the outputting member 30 relative to rotor 20 can be checked and changed to the most suitable angular position immediately.

FIG. 3 also shows that the rotor 20, the arm portion 31,and the pin portion 32 are all bounded within parallel lines also bounding the coil 40. For example, horizontal lines coincident with the upper and lower end lines of the coil 40 also bound the other parts. Such lines are indicative of bounding planes in the structure.

Further, it is not necessary to provide a large opening for receiving the rotation of the pin portion 32 in the lower plate 50, in addition to the opening for shooting. That is to say, the large opening for receiving the rotation of the pin portion 32 is provided in the upper plate 60 only. This prevents a dust from entering into the shutter chamber from the outside thereof. Elimination of the receiving opening 62 formed in the upper plate 60 further prevents the dust from entering into the shutter from the outside.

Additionally, it is necessary to provide the pin portion 32 of the outputting member 30 in the opposing direction of the conventional one so as to dispose the shutter blade 70 at the position described above. That is, the pin portion 32 is conventionally provided to stand in a direction away from the rotor 20. However, in the shutter drive device for a camera according to the present embodiment, the pin portion 32 is provided to stand toward the shutter blade 70 disposed within a virtual plane orthogonal to the spindle 52. That is to say, the pin portion 32 is provided to stand toward one end of the rotor 20 different from the other end secured with the outputting member 30. These arrangements allow the driving force of the rotor 20 to be transmitted to the shutter blade 70. The pin portion 32 is formed within the virtual plane orthogonal to the spindle 52.

Further, as mentioned above, the shutter blade 70 is disposed between the upper plate 60 and the lower plate 50 defining the shutter chamber. Additionally, the upper plate 60 and the lower plate 50 hold the electromagnetic actuator. Therefore, conventionally, it is necessary to provide a member (e.g., blade supporting plate) for holding the shutter blade. However, with the above configuration according to the present invention, the upper plate 60 and the lower plate 50 hold the electromagnetic actuator and the shutter blade 70. Hence, the thickness of the shutter drive device in the axial direction is reduced, and the number of parts is decreased.

While the preferred embodiments of the present invention have been illustrated in detail, the present invention is not limited to the above-mentioned embodiments, and other embodiments, variations and modifications may be made without departing from the scope of the present invention.

In the above embodiment, although the upper plate 60 is disposed near the object side, the lower plate 50 may be disposed near the object side.

Finally, several aspects of the present invention are summarized as follows.

According to an aspect of the present invention, there is provided a shutter drive device for a camera, the device including: a plate having an aperture; a shutter blade provided in the plate, and for opening and closing the aperture; and an driving source provided in the plate, and for driving the shutter blade. The driving source includes: a rotor magnetized with plural magnetic poles in a circumferential direction, and rotatable about an axis thereof; a stator generating magnetic force against the rotor; and a coil provided in the stator and for exciting the stator. The rotor has an arm portion extending outwardly from the axis of the rotor, and a pin portion engaging with the shutter blade and provided in the arm portion to stand. The rotor, the arm portion and the pin portion are disposed within a thickness of the coil in the axis direction.

With such a configuration, the rotor, having the arm portion and the pin portion and composed of the driving source for driving the shutter blades, is disposed within the thickness of the coil in the direction of the axis supporting the rotor for rotation, thereby reducing the thickness of the shutter drive device for a camera in the axis direction. This also allows the shutter drive device for a camera to be thin. Additionally, with such a configuration, the shutter drive device for a camera is sealed by the plate having a spindle about which the shutter blade rotates. It is not necessary to provide an opening for receiving the rotation of the pin portion, thereby preventing the dust from entering into the shutter from the outside.

Additionally, the rotor and the arm portion may be individual formed. With such a configuration, the angular position of the arm portion and the pin portion relative to the magnetic pole of the rotor is adjusted. This changes the design of the angular position with ease.

Further, the shutter drive device for a camera may include an upper plate and a lower plate holding the driving source, and the shutter blade may be hold between the upper plate and the lower plate. In such a configuration, a member holding the driving source and a member holding the shutter blade can be used in conjunction with each other. Further, the thickness of the shutter drive device for a camera in the axis direction can be reduced, and the number of the parts can be reduced.

What is claimed is:

1. A shutter drive device for a camera, comprising:
a plate having an aperture;
a shutter blade provided in the plate, and for opening and closing the aperture; and
a driving source provided in the plate, and for driving the shutter blade, wherein the driving source includes:
a rotor magnetized with plural magnetic poles in a circumferential direction, and rotatable about an axis thereof,
a stator generating magnetic force against the rotor, and
a coil provided in the stator and for exciting the stator;
wherein the rotor includes an arm portion extending outwardly from the axis of the rotor, and a pin portion engaging with the shutter blade and provided in the arm portion to stand, and
wherein the rotor, the arm portion and the pin portion are disposed within a thickness of the coil along an axial direction parallel to the axle of the rotor.

2. The shutter drive device for a camera of claim 1, wherein the rotor and the arm portion are individually formed.

3. The shutter drive device for a camera of claim 1, further comprising an upper plate and a lower plate holding the driving source and, the shutter blade therebetween.

4. The shutter drive device for a camera of claim 2, further comprising an upper plate and a lower plate holding the driving source and, the shutter blade therebetween.

5. The shutter drive device for a camera of claim 1, wherein the rotor, the arm portion and the pin portion are bounded within parallel planes, the planes also bounding the coil.

6. The shutter drive device for a camera of claim 1, wherein the axis comprises an axle of the rotor.

* * * * *